United States Patent Office 2,946,796
Patented July 26, 1960

2,946,796

SALTS OF ERGOT ALKALOIDS

Bernard Rudner, Pittsburgh, Pa., assignor to W. R. Grace & Co., New York, N.Y., a corporation of Connecticut No Drawing. Filed Oct. 15, 1958, Ser. No. 767,260

3 Claims. (Cl. 260—285.5)

This invention relates to quaternary nitrogenous salts. In one specific aspect, it relates to salts of ergot alkaloids which may be considered as N-amino ergot alkaloid derivatives.

The amount of mixed alkaloids in the ergot, a fungus growing in rye grass, does not exceed 0.1% by weight of the growth. Some of the complex alkaloids, such as ergotoxime, ergotamine and particularly ergonovine, are very important physiologically because they induce rhythmic contraction of the peurperal uterus. The ergot alkaloids appear to be amides of lysergic acid (or its stereoisomer)

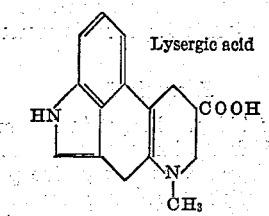

with certain amino acids or compounds derived from amino acids. I have discovered a new class of ergot hydrazinium compounds, heretofore unavailable, possessing remarkable physiological activity.

It is therefore an object of the present invention to provide a new generic class of pharmaceutically useful compounds.

The compounds of my invention are conveniently prepared by the action of chloramine on the various ergot alkaloids or mixtures of such alkaloids preferably naturally occurring mixtures such as ergotin. In the preferred practice of this invention, the appropriate alkaloid mixture dissolved in an unreactive solvent is exposed to a stream of gaseous chloramine. The resultant ergot hydrazinium chloride is isolated by conventional laboratory techniques. Compounds containing anions other than chloride are prepared by starting with the chloride and a compound containing the anion to be introduced.

In accordance with the present invention, I have made available a new class of compounds having the general formula:

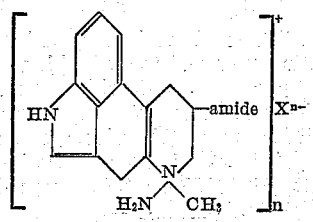

In the above formula, "amide" represents the naturally occurring amide constitutents present in ergot alkaloids. This will be discussed in detail below. X is an anion bearing the change $n$; $n$ also represents the number of cations required to balance the anionic charge.

An examination of the structure of lysergic acid shows it to have an asymmetric carbon atom (the carbon to which the carboxyl group is attached). It is not surprising that it and its derivatives occur as stereoisomeric pairs. This invention relates to quaternized derivatives of naturally occurring lysergic acid amides as shown above. The amine constituent, from which the amide may be considered as having been derived, may be a simple amine or a polyamide of alpha amino acids and other naturally related compounds such as pyruvic acid and dimethylpyruvic acid. The common ergot alkaloids are listed below in Table I together with their stereoisomers and the constituents of the amine portion of the molecule (as obtained on hydrolysis). The structural formula of ergotoxine is given first to be illustrative of the kind of linkages present and to show how the complex molecule is tied together. Not shown, of course, is the fact that the amino acids are stereospecific.

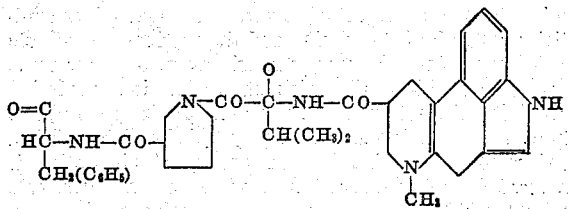

TABLE I

| Ergot Alkaloid | Stereoisomer | Amine Constituents |
|---|---|---|
| ergotamine | ergotaminine | ammonia, proline, phenylalanine, pyruvic acid. |
| ergotoxine | ergotinine | lysergic acid, dimethylpyruvic acid, proline, phenylalanine |
| ergonovine [1] | ergometrinine | 1-amino-1-propanol. |
| methylergonovine | | d-2-amino-1-butanol. |
| ergosine [2] | ergosinine | pyruvic acid, proline, leucine. |
| ergocristine | ergocristinine | dimethylpyruvic acid, proline, phenylalanine. |
| ergocornine | ergocorninine | dimethylpyruvic acid, proline, valine. |
| ergocryptine | ergocryptinine | dimethylpyruvic acid, proline, leucine. |

[1] Ergonovine is also known as ergobasine, ergoklinine, ergometrine ergotocine, ergostetrine and ergotrate.
[2] The racemic compound ergosine-ergosinine is known as ergoclavine.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

My invention covers the compounds obtained by chloramination (and subsequent metathesis) of ergot and the various ergot alkaloids or mixtures thereof. Consequently my invention includes the pure products inherently present in the reaction mixture even though all of them have not been specifically isolated and purified. For these novel compositions have been in fact prepared by using ergot as the starting amine. The scope and utility of my invention is further illustrated by the following examples:

*Example I*

A suspension of 100 g. of ergot in 300 ml. of chloroform was treated first with gaseous ammonia for 30 minutes followed by gaseous chloramine prepared from 10 g. of chlorine using the generator previously discussed. After all the chloramine had been consumed, the reaction mixture was evaporated to dryness. There was obtained 94.8 g. of the ergot alkaloid-chloramine adduct containing 2.3% ionic chloride and including the adducts of the alkaloids specifically enumerated in Table I. The product was partially soluble in water and only very slightly soluble in chloroform.

*Example II*

Two grams of ergotamine tartrate was dissolved in a minimum quantity of water and brought to a pH of 8 by the addition of solid sodium bicarbonate. The free amine was immediately extracted with two 100 ml. portions of chloroform and the extract dried. The chloroform solution was brought to 250 ml. and treated with excess chloramine. After standing overnight the reaction mixture was filtered and the filtrate evaporated to dryness leaving a residue of about one gram of dark brown crystals. The product was purified by extraction with benzene; N-aminoergotaminium chloride was a brown solid melting with decomposition at 185° C.

*Examples III and IV*

Separate portions of N-aminoergotaminium chloride were dissolved in water and treated with aqueous potassium hexafluorophosphate and with saturated aqueous picric acid. The resultant precipitates were collected by filtration and dried to give N-aminoergotaminium hexafluorophosphate (M.P. 285° C.) and the N-aminoergotaminium picrate (M.P. 153–155° C.) respectively.

*Example V*

A male mongrel dog weighing 9.4 kg. was anesthetized by the intraperitoneal administration of 100 mg./kg. of phenobarbital sodium and surgery was supported with intravenous pentobarbital sodium. The carotid artery was cannulated and connected to a mercury manometer for recording blood pressure. A Pfeiffer cannula was inserted into the trachea and connected to a Marey tembour for recording respiration. Blood pressure and respiration were recorded by ink-writing levers on a conventional kymograph. The product of Example I was suspended in 0.5% aqueous methyl cellulose at a concentration of 50 mg./ml. and the dog received two intraperitoneal injections of the solution giving doses of 50 and 100 mg./kg. The blood pressure showed a gradual fall from approximately 110 to 70 millimeters of mercury within one hour following administration of the 50 mg./kg. dose and did not return to pretreatment levels within a period of six hours. Injection of the 100 mg./kg. dose caused only a slight transient further drop in the blood pressure. There was no significant effect on blood pressure responses to acetylocholine, epinephrine, norepinephrine, histamine or nicotine at any time during the study.

I claim:
1. N-aminoergotaminium chloride.
2. N-aminoergotaminium picrate.
3. Compounds having the formula $R^+X^-$ wherein the cation $R^+$ is selected from the group consisting of N-aminoergotaminium, N-aminoergotamininium, N-aminoergotoxinium, N-aminoergotininium, N-aminoergonovinium, N-aminoergometrininium, N-aminomethylergonovinium, N-aminoergosinium, N-aminoergosininium, N-aminoergocristinium, N-aminoergocristininium, N-aminoergocornininium, N-aminoergorninium, N-aminoergocryptinium, N-aminoergocryptininium and $X^-$ is a pharmaceutically acceptable anion.

References Cited in the file of this patent
Henry: The Plant Alkaloids (1949), 4th edition, p. 531.